United States Patent
Chen et al.

(10) Patent No.: US 7,050,523 B2
(45) Date of Patent: May 23, 2006

(54) SYSTEMS AND METHODS FOR IMPROVING TIMING PHASE ESTIMATION

(75) Inventors: Qing Chen, Fremont, CA (US); Qian Cheng, Dekalb, IL (US)

(73) Assignee: U.S. Robotics Corporation, Schaumburg, IL (US)

( * ) Notice: Subject to any disclaimer, the term of this patent is extended or adjusted under 35 U.S.C. 154(b) by 740 days.

(21) Appl. No.: 10/112,996

(22) Filed: Mar. 29, 2002

(65) Prior Publication Data

US 2003/0185323 A1    Oct. 2, 2003

(51) Int. Cl.
*H04L 7/00* (2006.01)
*H03H 7/30* (2006.01)

(52) U.S. Cl. .................. 375/371; 375/233

(58) Field of Classification Search .......... 375/229, 375/232, 233, 355, 354, 371
See application file for complete search history.

(56) References Cited

U.S. PATENT DOCUMENTS 6,529,549 B1 *   3/2003   Norrell et al. ............ 375/229
6,891,910 B1 *   5/2005   Hwang et al. ............ 375/355

* cited by examiner

*Primary Examiner*—Jay K. Patel
*Assistant Examiner*—David B. Lugo
(74) *Attorney, Agent, or Firm*—Mayer, Brown, Rowe & Maw LLP

(57) ABSTRACT

Systems and methods are provided for performing the required phase calculation in a telecommunications system in order to optimize system performance more quickly and with reduced complexity as compared to prior approaches to solving this problem. In accordance with the preferred exemplary embodiment of the present invention, the phase delay of the precursor EQ is utilized for estimating the entire DFE phase shift by calculating the estimation exclusively based on an output of the precursor EQ this estimation is then used for adjusting the timing phase based on the phase estimation.

2 Claims, 1 Drawing Sheet

SYSTEMS AND METHODS FOR IMPROVING TIMING PHASE ESTIMATION

BACKGROUND OF THE INVENTION

1. Field of the Invention

The present invention relates generally to the field of telecommunications devices. More specifically, the present invention is directed to systems and methods for improving timing phase estimation in telecommunications equipment.

2. Description of the Related Art

Currently, in the field of analog modem devices, and particularly with respect to the V.92 quick connect phase I, a digital modem transmits QTS signals at the rate of 8000 symbols per second to the analog modem. The QTS signals consist of 128 repetitions of the sequence {+V, +0, +V,−V,−0,−V} where V is defined to be the PCM code word whose Ucode is $U_{QTS}$ and 0 is the PCM code word with Ucode 0[1]. After analog-to-digital conversion of the voice band modem signal and demodulation, the receiver can get a 4 kHz tone. The challenge in this arrangement is to utilize the 4 kHz tone and the converged DFE coefficients to lock the timing phase to the optimal point relative to the symbol interval. The desired result is to adjust the timing interpolator to sample the equalized signal at the maximum eye opening instant. It is recognized that this can be achieved at the phase of $(2i+1)\pi/2$, where $i \in \{integer\}$ of the 4 kHz tone.

Those skilled in the art have recognized that the timing phase should include the phase shifts caused by both the precursor equalizer (linear portion) and post cursor equalizer (decision feedback portion). Is difficult to estimate the phase shift caused by the postcursor EQ because of the fact that the post cursor EQ is usually implemented with a filter and the phase response of the filter is typically non-linear. Furthermore unless the sampling phase is precisely locked at the right point relative to the symbol interval, the decision made by the DFE will be inaccurate. One prior approach to this problem is to utilize the DFE output to perform the estimation. However, there is no correct decision available at that time and the estimation is therefore not accurate enough.

Accordingly, there remains a need in the field for improved estimation of the desired phase. The inventors of the instant application have achieved such a solution which improves performance by achieving the desired phase estimation in less time and through utilizing a less complex system and calculation.

SUMMARY OF THE INVENTION

The present invention is directed to systems and methods for performing the required phase calculation in order to improve system performance more quickly and with reduced complexity as compared to prior approaches to solving this problem. Specifically, in accordance with a preferred exemplary embodiment of the present invention, the inventors have discovered that by utilizing the precursor EQ output, the estimated timing phase γ is precisely the optimal phase relative to the symbol interval. More specifically, it is now recognized that the post cursor EQ does not generate phase shift for the 4 kHz tone.

In accordance with an exemplary embodiment of the present invention, it has been recognized that for a 4 kHz tone with an 8K sampling rate, there are only two decision levels with equal amplitude and opposite signs so that the input and output of the DFE have the following relationship:

$$\sum_{i=0}^{n_1} a_i \cdot \sin(\alpha - i \cdot \pi/2) + \sum_{j=0}^{n_2} (-1)^{j+1} \cdot b_j \cdot r \cdot \sin(\alpha + \beta) = r \cdot \sin(\alpha + \beta)$$

Where
  r, Equalizer amplitude gain at 4 kHz;
  α, Initial phase before DFE;
  β, Equalizer phase compensation;
  $a_i$, Converged precursor fractionally spaced EQ coefficients saved from normal connection;
  $b_j$, Converged postcursor EQ coefficients saved from normal connection Accordingly the following relationship exists:

$$\sum_{i=0}^{n_1} a_i \cdot \sin(\alpha - i \cdot \pi/2) = r' \cdot \sin(\alpha + \beta)$$

This indicates that for the 4 kHz tone utilized in the conventional system, the entire DFE phase shift can be estimated by using the output of the precursor EQ. Test results utilizing this approach indicates significant improvement over the prior art solution. Specifically, the data pump code locks timing very quickly with this approach. The algorithm has been implemented for testing purposes in the V.92 standard and Quickconnect phase one performs much better than other prior solutions. Those skilled in the art will recognize that this approach has other applications as well.

DETAILED DESCRIPTION OF THE PRESENTLY PREFERRED EMBODIMENTS

Figure 1:
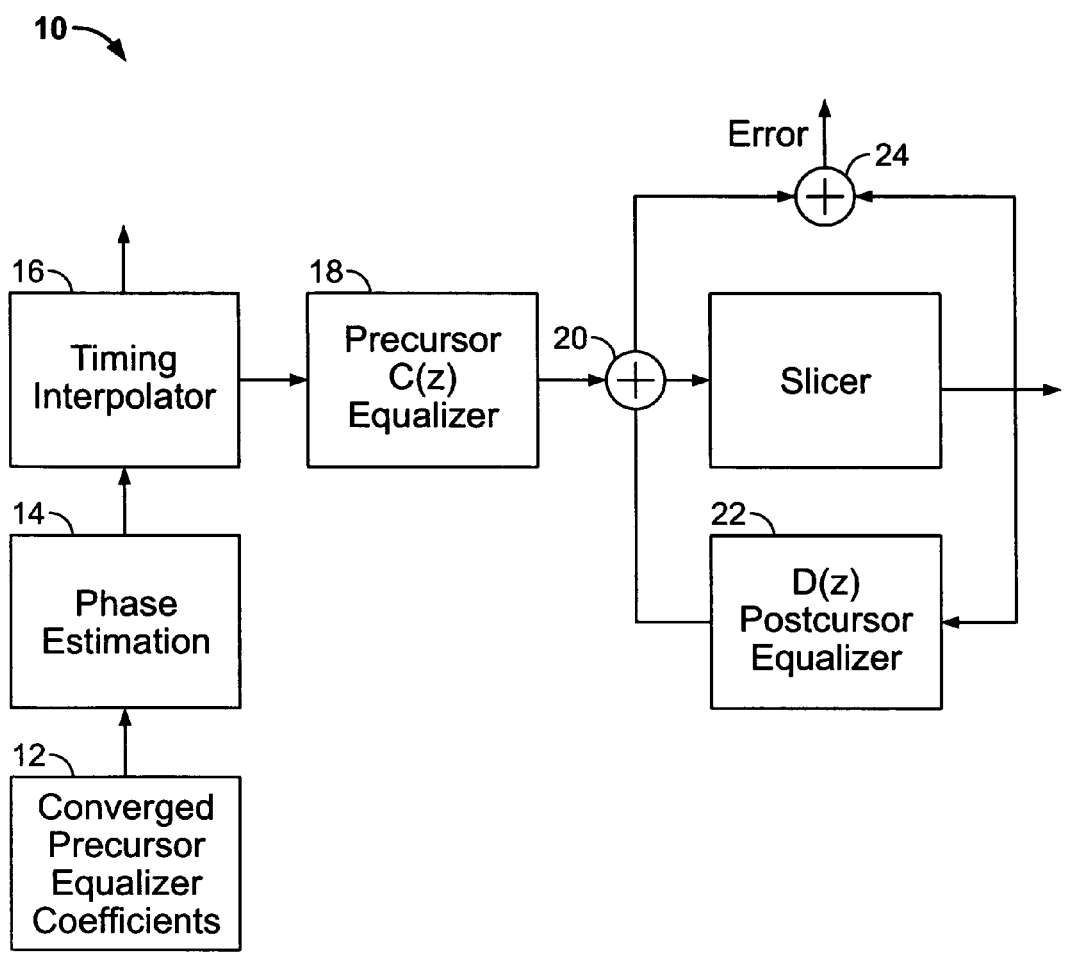
FIG. 1 illustrates a first exemplary embodiment of the invention.

FIG. 1 illustrates a first preferred exemplary embodiment of the present invention which is shown generally at 10. In accordance with preferred exemplary embodiment, calculations are performed in order to improve the timing phase in a communications systems. It will recognized by those skilled in the art that a digital signal processor will be utilized in the preferred embodiments for performing the indicated calculations, however, it should be recognized that other conventional techniques may also be utilized in order to perform the required calculations.

FIG. 1 is essentially a block diagram illustration of the various relevant calculations that are made by the system. In a first block 12, the precursor equalizer provides a signal for phase estimation in block 14. The output from the phase estimation step or block 14 is thereafter provided to the timing interpolator step or block 16. The timing interpolator 16 provides an output to the input of the precursor equalizer 18. The precursor equalizer 18 also has an output that feeds an adder 20. An output from the postcursor equalizer 22 also feeds the adder 20. The adder 20 has an output that feeds a further summing device 24 that provides the DFE output.

In accordance with the preferred exemplary embodiment of the present invention, systems and methods are utilized for performing the required phase calculation in order to improve system performance more quickly and with reduced complexity as compared to prior approaches to solving this problem. Specifically, in accordance with a preferred exemplary embodiment of the present invention, the inventors have discovered that by utilizing the precursor EQ output, the estimated timing phase γ is precisely the optimal phase relative to the symbol interval. More specifically, it is now recognized that the post cursor EQ does not generate phase shift for the 4 kHz tone.

In accordance with the preferred exemplary embodiment of the present invention, it has been recognized that for a 4 kHz tone with an 8K sampling rate, there are only two decision levels with equal amplitude and opposite signs so that the input and output of the DFE have the following relationship:

$$\sum_{i=0}^{n_1} a_i \cdot \sin(\alpha - i \cdot \pi/2) + \sum_{j=0}^{n_2} (-1)^{j+1} \cdot b_j \cdot r \cdot \sin(\alpha + \beta) = r \cdot \sin(\alpha + \beta)$$

Where
r, Equalizer amplitude gain at 4 kHz;
α, Initial phase before DFE;
β, Equalizer phase compensation;
$a_i$, Converged precursor fractionally spaced EQ coefficients saved from normal connection;
$b_j$, Converged postcursor EQ coefficients saved from normal connection Accordingly the following relationship exists:

$$\sum_{i=0}^{n_1} a_i \cdot \sin(\alpha - i \cdot \pi/2) = r' \cdot \sin(\alpha + \beta)$$

This indicates that for the 4 kHz tone utilized in the conventional system, the entire DFE phase shift can be estimated by using the output of the precursor EQ. Test results utilizing this approach indicates significant improvement over the prior art solution. Specifically, the data pump code locks timing very quickly with this approach. The algorithm has been implemented for testing purposes in the V.92 standard and Quickconnect phase one performs much better than other prior solutions. Those skilled in the art will recognize that this approach has other applications as well.

We claim:

1. A method of determining a desired timing phase in a communications device comprising the steps of:
   establishing a normal connection and saving all converged precursor fractionally spaced equalizer coefficients from the normal connection;
   estimating a subsequent entire DFE phase shift by calculating the estimation exclusively based on an output of a precursor equalizer using the saved converged precursor fractionally spaced equalizer coefficients; and
   adjusting the timing phase based on the phase estimation.

2. A communications device allowing optimal timing phase comprising a digital signal processor including:
   a precursor equalizer providing a signal for phase estimation;
   a timing interpolator coupled to the precursor equalizer;
   a postcursor equalizer;
   an adder coupled to the outputs of the precursor equalizer, timing interpolator and postcursor equalizer; and
   a summing device providing a DFE output coupled to the adder, wherein the digital signal processor saves all converged precursor fractionally spaced equalizer coefficients from a normal connection and estimates a DFE phase shift by calculating the estimation exclusively based on the precursor equalizer output using the saved converged precursor fractionally spaced equalizer coefficients; and adjusts the timing phase based on the phase estimation.

* * * * *